US009683144B2

(12) United States Patent
Ellringmann et al.

(10) Patent No.: US 9,683,144 B2
(45) Date of Patent: *Jun. 20, 2017

(54) PRESSURE-SENSITIVE ADHESIVE MASS FOR LOW ENERGY OR ROUGH SURFACES

(71) Applicant: TESA SE, Norderstedt (DE)

(72) Inventors: Kai Ellringmann, Hamburg (DE); Marc Husemann, Hamburg (DE)

(73) Assignee: TESA SE, Norderstedt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/023,760

(22) PCT Filed: Sep. 15, 2014

(86) PCT No.: PCT/EP2014/069626
§ 371 (c)(1),
(2) Date: Mar. 22, 2016

(87) PCT Pub. No.: WO2015/043998
PCT Pub. Date: Apr. 2, 2015

(65) Prior Publication Data
US 2016/0237325 A1 Aug. 18, 2016

(30) Foreign Application Priority Data
Sep. 27, 2013 (DE) .................. 10 2013 219 495

(51) Int. Cl.
| C09J 133/08 | (2006.01) |
| C09J 4/06 | (2006.01) |
| C09J 133/06 | (2006.01) |
| B32B 37/12 | (2006.01) |
| C09J 7/02 | (2006.01) |
| C08F 220/08 | (2006.01) |
| C08F 220/18 | (2006.01) |

(52) U.S. Cl.
CPC ............ *C09J 133/08* (2013.01); *B32B 37/12* (2013.01); *C09J 4/06* (2013.01); *C09J 7/0217* (2013.01); *C09J 133/06* (2013.01); *B32B 2037/1246* (2013.01); *C08F 220/08* (2013.01); *C08F 220/18* (2013.01); *C08F 2220/1891* (2013.01); *C09J 2201/122* (2013.01); *C09J 2201/606* (2013.01); *C09J 2433/00* (2013.01)

(58) Field of Classification Search
CPC . C09J 133/08; C09J 4/06; C09J 7/0217; C09J 133/06; C09J 2201/122; C09J 2201/606; C09J 2433/00; B32B 37/12; B32B 2037/1246; C08F 220/08; C08F 220/18; C08F 2220/1891
See application file for complete search history.

(56) References Cited

U.S. PATENT DOCUMENTS

| 5,602,221 A | 2/1997 | Bennett et al. |
| 2007/0087192 A1 | 4/2007 | Keite-Telgenbuscher et al. |
| 2011/0130582 A1 | 6/2011 | Bette et al. |
| 2014/0234584 A1* | 8/2014 | Hyde et al. .......... C09D 107/00 428/152 |
| 2015/0175852 A1 | 6/2015 | Ellringmann et al. |
| 2016/0230049 A1* | 8/2016 | Husemann et al. ... C09J 7/0217 |

FOREIGN PATENT DOCUMENTS

| DE | 10 2005 043999 A1 | 3/2007 |
| DE | 10 2012 208597 A1 | 11/2013 |
| EP | 1 308 493 A2 | 5/2003 |
| EP | 1 318 181 A1 | 6/2003 |
| WO | 98/01478 A1 | 1/1998 |
| WO | 2009/124979 A1 | 10/2009 |
| WO | 2011/064190 A1 | 6/2011 |
| WO | 2013/059549 A1 | 4/2013 |
| WO | 2014/001096 A1 | 1/2014 |

OTHER PUBLICATIONS

International Search Report dated Oct. 14, 2014, mailed Oct. 21, 2014.
English Translation on International Search Report dated Oct. 14, 2014, mailed Oct. 21, 2014.
German Search Report dated Mar. 26, 2014.
Carroy, "Chemistry and Technology of UV and EB Formulation for Coatings, Inks and Paints" (Oldring (Ed.), 1994, Sita, London).
Fouassier, "Photoinitiation, Photopolymerization and Photocuring: Fundamentals and Applications" (Hanser-Verlag, Munich 1995).
Ihara et al., "Living Polymerizations and Copolymerizations of Alkyl Acrylates by the Unique Catalysis of Rare Earth Metal Complexes", Macromolecules, 1995, vol. 28, pp. 7886-7892.
Donatas Satas, "Handbook of Pressure Sensitive Adhesive Technology", (van Nostrand, 1989), pp. 526-545.
Houben Weyl, Methoden der Organischen Chemie, vol. E 19a, pp. 60-147.

* cited by examiner

*Primary Examiner* — Nathan M Nutter
(74) *Attorney, Agent, or Firm* — Norris McLaughlin & Marcus P.A.

(57) ABSTRACT

Pressure-sensitive adhesive mass comprising an at least partially cross-linked polyacrylate, based on a monomer mixture comprising a) an acrylic acid ester of the formula $CR^3_2{=}C(R^2)(COOR^1)$, b) an acrylic acid of the formula $CR^5_2{=}C(R^4)(COOH)$, c) olefinically unsaturated monomers having at least one functional group, and d) 0 to 95 wt. % of acrylic acid ester of the formula $CR^8_2{=}C(R^7)(COOR^6)$, and 20 to 60 parts by weight of at least one tackifying resin.

22 Claims, No Drawings

PRESSURE-SENSITIVE ADHESIVE MASS FOR LOW ENERGY OR ROUGH SURFACES

This is a 371 of PCT/EP2014/069626 filed 15 Sep. 2014, which claims foreign priority benefit under 35 U.S.C. 119 of German Patent Application 10 2013 219 495.1 filed Sep. 27, 2013, the entire contents of which are incorporated herein by reference.

The invention relates to a pressure sensitive adhesive, an adhesive tape comprising a pressure sensitive adhesive of this kind, and their production methods, the use of the pressure sensitive adhesive, and the use of monomers.

BACKGROUND OF THE INVENTION

The industrial demand for pressure-sensitive adhesives (PSAs) with significantly improved adhesion to substrates of low surface energy (LSE) has risen sharply in recent times. Substrates considered to be of low energy generally have a surface energy of less than 40 dyn/cm$^2$, typically less than 35 dyn/cm$^2$. Considered particularly critical are materials which as well as a low surface energy also possess rough surfaces and, furthermore, low Shore A hardnesses of less than 50, typically less than 40. In view of the continually improving properties and the relatively low costs, such materials are being used to ever-increasing extent in industrial applications, meaning that the demand for suitable PSAs is growing as well.

It will be desirable if such PSAs also had good properties in terms of adhesion or peel adhesion, tack, and cohesion. To date, however, it has not been possible to adjust these parameters independently of one another.

For example, block copolymer adhesives can generally be adjusted using tackifiers in such a way that high peel resistances are achieved on LSE substrates. Nevertheless, block copolymer adhesives generally exhibit poor temperature stability, since the hard domains soften at high temperatures.

Acrylate PSAs can generally be adjusted such that a high static shear resistance at elevated temperatures is achieved. In general, however, they possess low peel adhesion to LSE surfaces. Tackified, acrylate-based adhesives, such as those set out in U.S. Pat. No. 5,602,221 (Bennett et al.), exhibit improved adhesion to LSE substrates.

The proportion of the resins is limited, however, since the apolar acrylate comonomers raise the glass transition temperature $T_g$ of the overall adhesive formulation. Through addition of tackifying resins, there is a further rise in the glass transition temperature, meaning that the tack is lost and the flow-on of the adhesive is impaired.

It is an object of the invention, therefore, to provide a PSA having improved properties. Further objects are to specify a production method for such a PSA, an adhesive tape comprising the PSA, a production method for the adhesive tape, a use of the PSA, and the use of monomers.

SUMMARY OF THE INVENTION

A pressure sensitive adhesive (PSA) is specified. According to at least one embodiment, the PSA comprises an at least partly crosslinked polyacrylate based on a monomer mixture, the monomer mixture comprising
a) 5 to 100 wt % of acrylic esters of the formula $CR^3{}_2\!=\!C(R^2)(COOR^1)$ as monomers A, where $R^1$ is a branched alkyl group having 16 to 22 C atoms which has at least two branching sites, $R^2$ is selected from H, methyl or halogen, and $R^3$ independently at each occurrence is selected from H or halogen,
b) 0 to 20 wt % of acrylic acid of the formula $CR^5{}_2\!=\!C(R^4)(COOH)$ as monomers B, where $R^4$ is selected from H, methyl or halogen, and $R^5$ independently at each occurrence is selected from H or halogen,
c) 0 to 30 wt % of olefinically unsaturated monomers having at least one functional group as monomers C, where the monomers C do not fall within the monomers A, B, and D, and
d) 0 to 95 wt % of acrylic esters of the formula $CR^8{}_2\!=\!C(R^7)(COOR^6)$ as monomers D, where $R^6$ is a linear, singly branched, cyclic or polycyclic alkyl group having 1 to 14 C atoms, $R^7$ is selected from H, methyl or halogen, and $R^8$ independently at each occurrence is selected from H or halogen; and also
at least one tackifying resin, which is present in a proportion of 20 to 60 parts by weight per 100 parts by weight of polyacrylate.

The monomers A, B, C, D, and the tackifying resin may each independently of one another be a mixture of compounds or else a pure compound. "Wt %" stands for percent by weight. Halogens may be selected from F, Cl, Br, I, and combinations thereof, more particularly from F and Cl and combinations thereof. The PSA may also consist of the polyacrylate and the at least one tackifying resin. The at least partly crosslinked polyacrylate comprises polymer strands which originate from polymerization of the monomer mixture and have been subsequently at least partly crosslinked with one another.

The PSA of the invention features, in particular, a combination of high peel adhesion and tack at room temperature and also exhibits very good cohesive properties, allowing the PSA to overcome, in particular, the abovementioned disadvantages of conventional adhesives. The PSA is very suitable for the bonding of apolar and/or porous substrates.

DETAILED DESCRIPTION

Apolar substrates have a surface energy of less than 40 dyn/cm$^2$, typically less than 35 dyn/cm$^2$, or even less than 30 dyn/cm$^2$. Examples of materials which are distinguished by LSE surfaces and can be bonded very effectively with the PSA of the invention include, for example, UV-curing paints, powder coatings, and also polyolefins such as polypropylene (PP), high-pressure polyethylene (LDPE), low-pressure polyethylene (HDPE), ultrahigh molecular weight polyethylene (UHMWPE), and polymers of ethylene-propylene-diene monomer (EPDM). The PSA is also suitable for bonding materials which—possibly as well as a low surface energy—have rough surfaces and, moreover, possess low Shore A hardnesses of less than 50, typically less than 40. Examples of such materials are open-cell foams of PE, EPDM, polyester or polyurethane. As well as apolar surfaces, less demanding polar surfaces as well may be bonded effectively with the PSA.

The surface tension can be determined according to DIN ISO 8296. Test inks from Softal can be used for this purpose, for example. The inks are available in the range from 30 to 72 mN/m. The ink is applied with a line of ink to the surface. If the line of ink contracts in less than 2 seconds, the measurement is repeated with an ink of lower surface tension. When the line of ink remains unchanged for longer than 2 seconds, the measurement is repeated with ink of higher surface tension until the 2 seconds are reached. The FIGURE indicated on the bottle at that point corresponds to the surface energy of the film.

The measurement of the Shore A hardness is described in the test standards DIN 5305, ISO 868, ISO 7619, and ASTM D 2240, with the Shore hardnesses being reported on a scale from 0 to 100. In the course of the test, the depth of penetration of a spring-loaded pin into the material is measured. A low depth of penetration correlates with a high Shore value, and a large depth of penetration with a low Shore hardness. For Shore A measurements, the penetration element consists of a truncated cone having a diameter of 0.79 mm and an opening angle of 35°. For thermoplastic elastomers, DIN 7619-1 has been introduced.

The inventors have surprisingly found that through the use of the monomers A, in particular, the advantageous properties of the PSA are made possible.

Because of the highly branched, long alkyl chain $R^1$ of the monomers A, these monomers are very apolar. On the basis of the monomers A, the polyacrylate itself may also have a very apolar character, because, for example, the comparatively polar acrylate framework of the polyacrylate can be shielded toward the outside. As a result of this, dipole-dipole interactions with a substrate to be bonded are largely prohibited. The apolar alkyl groups $R^1$ of the monomers A also ensure improved interaction with apolar substrates, thus intensifying the adhesion and improving the wetting of the substrates with the PSA. Furthermore, they permit affective mixing of the polyacrylate with the tackifying resins. This strengthens the cohesion in the PSA, allowing it to include even comparatively large quantities of tackifying resins. The distribution of the tackifying resin in the PSA may be, in particular, homogeneous.

Another property of the polyacrylate, associated with the highly branched alkyl groups $R^1$ of the monomers A, is a low glass transition temperature $T_g$. On account of the high degree of branching, the crosslinked monomers show no tendency toward side chain crystallization. Accordingly, a homopolymer of the monomers A has a static glass transition temperature $T_g$ of less than 0° C., more particularly less than −20° C. According to certain embodiments, the statistical glass transition temperature of such a homopolymer may even be less than −40° C., and occasionally even less than −60° C. The $T_g$ is determined according to DIN 53765:1994-03. Through the proportion of the monomers A, therefore, it is possible to lower the glass transition temperature of the polyacrylate or to obtain a low glass transition temperature. Herein lies an essential difference from conventionally used alkyl acrylic esters with long, largely or entirely unbranched alkyl groups, such as stearyl acrylate, which tend toward side chain crystallization and lead therefore to an increase in the glass transition temperature and/or have to be melted.

The reason is that in general even tackifying resins result in an increase in the glass transition temperature. In order to obtain good tack and flow-on properties, however, the glass transition temperature of an adhesive must not be too high, ideally below 25° C. Conventional adhesives therefore generally either exhibit poor tack and flow-on properties, with a high tackifying resin content, or they include only small amounts of tackifying resins, and then exhibit low adhesion. The inventors now found that through a proportion, more particularly a high proportion, of the monomers A in the polyacrylate, it is possible even for comparatively large amounts of tackifying resins to be present in the adhesive without a loss of tack or deleterious alteration to the flow-on properties. With advantage, the PSAs of the invention generally have a glass transition temperature of <25° C., more particularly <15° C. Despite this, on account of the high tackifying resins content, they exhibit effective adhesion to apolar surfaces. For PSAs of the invention, the tan δ (determined by test method B) is between 0.2 and 1.0, more particularly between 0.3 and 0.8, and preferably between 0.4 to 0.7, a level associated with good flow-on properties.

It has surprisingly emerged, moreover, that the monomers A, particularly in the case of radical crosslinking, can lead to very good crosslinking efficiency. The inventors assume that tertiary radicals, which are decidedly stable, are able to form easily at the branching sites. These radicals may be crosslinked with one another, allowing crosslinking to take place via the side chain of the monomers A as well. As a result, the PSA is given very good cohesion properties. On account of the good crosslinking, it generally has high temperature stability and aging stability. For example, a PSA of the invention can easily be heated at 200° C. for 15 minutes. On account of the good crosslinking it can also be generally diecut effectively, thus facilitating industrial applications.

Because of the above-described advantageous crosslinking, furthermore, the PSAs of the invention also exhibit good stability toward plasticizers. The PSA is accordingly suitable as well for the bonding of substrates which include a high plasticizers content.

The polyacrylate may be composed entirely of monomers A or else based proportionally on other monomers, more particularly on the monomers B, C or D in any desired combinations. The polyacrylate may have an average molecular weight of 50 000 to 4 000 000 g/mol, more particularly 100 000 to 3 000 000 g/mol, preferably 400 000 to 1 400 000 g/mol. The average molecular weight is determined via gel permeation chromatography (GPC) (test method A).

As already described, the high degree of branching of the alkyl groups $R^1$ is important for the properties of the PSA. The alkyl groups $R^1$ have a main chain on which side chains are attached at the branching sites. The branching sites therefore correspond to tertiary and quaternary, but more particularly tertiary, carbon atoms in the alkyl group $R^1$. The branching sites and the amount of monomers A in the PSA may be determined and demonstrated, respectively, by means of $^{13}C$ NMR spectroscopy, for example.

According to a further embodiment, at least half of the monomers A include an alkyl group $R^1$ having three or more branching sites. At least 75%, more particularly at least 90%, or else all of the monomers A may have an alkyl group $R^1$ having three or more branching sites. In general the monomers A have 3 or 4, more particularly 3, branching sites. A higher level of branching sites leads to a lower crystallization tendency and to a lower glass transition temperature, thereby enabling the above-described advantages in improved form. There is also a further improvement in the crosslinking.

According to another embodiment, $R^2$ is selected from H or methyl, and $R^3$ is H in the monomers A. In that case the monomers A are alkyl esters of acrylic or methacrylic acid. These monomers are generally more favorable in production than the halogenated derivatives.

The alkyl groups $R^1$ of the monomers A are preferably pure hydrocarbon radicals.

As already described above, the alkyl groups $R^1$ of the monomers A include a main chain on which side chains are attached at the branching sites. According to a further embodiment, at least 75%, more particularly at least 90%, or all of these side chains have 2 to 4 C atoms. Side chains of this size are an advantage since they lead to less rigid alkyl radicals than, for example, methyl groups. They ensure very low crystallization tendency and effective shielding of the polar scaffold in the polyacrylate.

According to a further embodiment, the branching sites in the alkyl groups $R^1$ of the monomers A are spaced apart by hydrocarbon chains having 2 to 5, more particularly 3 to 4, C atoms. The alkyl groups $R^1$ of the monomers A preferably have a construction reminiscent of dendrimers.

In a further advantageous refinement, the alkyl groups $R^1$ of the monomers A are selected from triply branched C17 alkyl groups.

The monomers A may be formed for example, by esterification of acrylic acid or of an acrylic acid derivative with a corresponding branched alkyl alcohol, viz $R^1$—OH. The parent alcohol $R^1$—OH may be obtained, for example, in the steam cracking of oil, or else may be prepared entirely synthetically. Purification is possible by distillation or by chromatographic methods. A description of the parent alcohols is given in WO 2009/124979, the relevant disclosure content of which is hereby incorporated by reference. An esterification of the alcohols to the acrylate is described in WO 2011/64190, the relevant disclosure content of which is hereby incorporated by reference.

The PSA comprises tackifying resins. Resins of this kind have already been described in the literature and also known per se to the skilled person by this term. They are polymers of one or more different monomers, the polymers having a comparatively low molecular weight and being able to improve the adhesion properties of an adhesive. With regard to the tackifying resins and particularly their preparation, reference is made to the "Handbook of Pressure Sensitive Adhesive Technology" by Donatas Satas (van Nostrand, 1989), the relevant disclosure content of which is hereby incorporated by reference. There is in principle no restriction of the selection of tackifying resins.

According to one further embodiment, the tackifying resin has an average molecular weight of less than 4000 g/mol. In general the average molecular weight is at least 100 g/mol, as for example 500 to 3000 g/mol, and more particularly 1000 to 2000 g/mol. The molecular weight is determined by test method A.

According to a further embodiment, the tackifying resin is selected from a group which encompasses pinene resins, indene resins, and rosins, and also their disproportionate, hydrogenated, polymerized or esterified derivatives and salts; aliphatic hydrocarbon resins; alkylaromatic hydrocarbon resins; aromatic hydrocarbon resins; terpene resins; terpene-phenolic resins; C5 and C9 hydrocarbon resins, which may be at least partly hydrogenated; natural resins; and combinations thereof. Via the selection and/or the combination of tackifying resins it is possible to fine-tune the properties of the PSA.

In general the polyacrylate has high compatibility with the tackifying resins. On account of its apolar character, however, the polyacrylate also still has good compatibility with very apolar resins, which is not necessarily the case with conventional polymers. An example of a suitable way of grading the polarity of the tackifying resins is the determination of the DACP (Diacetone Alcohol Cloud Point). The procedure here is analogous to that of ASTM D6038. The higher the DACP, the more apolar the tackifying resins and the poorer their compatibility with relatively polar polyacrylates. According to a further embodiment, the tackifying resin has a DACP of greater than 0° C., more particularly of greater than 20° C., and preferably of greater than 40° C.

The tackifying resin may be selected preferably from C5 and/or C9 hydrocarbon resins, which may be at least partly hydrogenated. These resins exhibit particularly high compatibility with the monomer A of the polyacrylate. A higher degree of hydrogenation raises the DACP.

It has further been ascertained surprisingly, that polyacrylates having a comparatively high proportion of monomers A, of more than 50 wt %, for example, also—in spite of the shielding apolar groups—have a high compatibility with polar tackifying resins. Polar tackifying resins are, for example, rosins. In general a high compatibility with polar tackifying resins as well has been found for those resins having a DACP of below −20° C. According to a further embodiment, the tackifying resin has a DACP of less than −20° C.

The monomers D can be used as a supplement to the monomer A for preparing the polyacrylate or the PSA. The alkyl group $R^6$ is selected such that the monomers D are still relatively apolar and do not exhibit a high crystallization tendency. The monomers D can also be mixed well with the monomers A. Via the choice of monomers D it is possible to fine-tune the properties of the PSA. They may be less expensive than the monomers A, meaning that combinations of the monomers A and D may also be useful for economic reasons. Moreover, the polarity of the polyacrylate can be adjusted, in order to achieve further improvement in compatibility with polar resins, for example.

According to a further embodiment, the monomer mixture has a proportion of at least 5 wt % of monomers D.

According to a further embodiment, $R^7$ is selected from H and methyl, and $R^8$ is H, in the monomers D.

According to a further embodiment, $R^6$ in the monomers D is selected from a group which encompasses methyl, ethyl, propyl, pentyl, hexyl, heptyl, octyl, nonyl, decyl, undecyl, lauryl, and the branched isomers thereof; cycloalkyl groups and polycyclic alkyl groups, it being possible for the cycloalkyl groups and polycyclic alkyl groups to be substituted by alkyl groups, halogen atoms or cyano groups; and combinations thereof.

Examples of branched isomers for $R^6$ are isobutyl, 2-ethylhexyl and isooctyl. Examples of cyclic and polycyclic alkyl groups $R^6$ are cyclohexyl, isobornyl, and 3,5-dimethyladamantyl. Advantageous monomers D are, for example, isobutyl acrylate, 2-ethylhexyl acrylate, 2-ethylhexyl methacrylate, isooctyl acrylate, isooctyl methacrylate, cyclohexyl methacrylate, isobornyl acrylate, isobornyl methacrylate, and 3,5-dimethyladamantyl acrylate, and combinations thereof.

According to a further embodiment, the alkyl group $R^6$ of the monomers D contains 4 to 9 C atoms. A corresponding selection can be made from examples identified above.

As already described above, the polyacrylate includes a proportion of monomers A of from 5 to 100 wt % of the underlying monomer mixture. A high proportion of monomers A in the monomer mixture on which the polyacrylate is based is useful in order to obtain a decidedly apolar character and good crosslinking. According to a further embodiment, the monomer mixture includes a proportion of monomers A of at least 45 wt %, more particularly at least 60 wt %, and preferably at least 70 wt %. The proportion of monomers A may be at least 80 wt % or even at least 90 wt %.

According to a further embodiment, the monomer mixture comprises 5 to 45 wt %, more particularly 10 to 30 wt %, of monomers D. In such an embodiment a proportion of at least 45 wt % of monomers A is generally employed.

Advantageous polyacrylates having an explicitly apolar character can also be obtained by the presence in the monomer mixture of the monomers A and D in corresponding amounts. According to one further embodiment, the monomer mixture comprises a proportion of at least 80 wt %, more particularly at least 90 wt %, of monomers A or of at least 80 wt %, more particularly at least 90 wt %, of the monomers A and D together.

A high proportion of apolar monomers A, or A and D, of this kind has the effect in particular of favoring the use of large amounts of tackifying resins. According to one development of this embodiment, the tackifying resin is present in a proportion of at least 40 parts by weight, more particularly at least 45 parts by weight, based on 100 parts by weight of polyacrylate in the PSA.

The monomers A lead to a lower glass transition temperature than is the case for the monomers D. Since tackifying resins in turn raise the glass transition temperature, further advantageous refinements come about if the monomer mixture comprises at least 80 wt %, more particularly at least 90 wt %, of monomer A and the tackifying resin is present at not less than 40 parts by weight, more particularly not less than 45 parts by weight, based on 100 parts by weight of polyacrylate in the PSA.

For economic reasons in particular, embodiments may also be used wherein the proportion of monomers A in the monomer mixture is lower. According to one further embodiment, the monomer mixture comprises a proportion of monomers A of up to 40 wt %, more particularly up to 30 wt %. The mixture may comprise, for example, a proportion of monomers A of 5 to 25 wt %, more particularly 5 to 15 wt %. The monomer mixture in this case may include a proportion of monomers D of at least 40 wt %, more particularly at least 50 wt %, and preferably at least 60 wt %. It may also include a proportion of monomers D of at least 75 wt %. In that case, optionally, the PSA may comprise a proportion of tackifying resin of less than 45 parts by weight, more particularly less than 40 parts by weight, based on 100 parts by weight of polyacrylate.

The polyacrylate may be based on the monomer A alone or else on a combination of monomers A and D. Depending on crosslinking technique it may be advantageous for the monomer mixture also to comprise monomers B and/or C. According to one further embodiment, the monomer mixture comprises a proportion of 0.01 to 10 wt %, more particularly 0.5 to 5 wt %, of monomers B and/or 0.01 to 20 wt %, more particularly 0.1 to 10 wt %, and preferably 0.5 to 5 wt %, of monomers C. The monomers B and C may also be used to fine-tune the properties of the PSA.

The monomers B may have the effect, for example, of facilitating thermal crosslinking. There is no need for monomers C for that purpose.

According to one further embodiment, $R^4$ is selected from H and methyl, and $R^5$ is H, in the monomers B. These monomers are less expensive than the halogenated derivatives.

The monomers C can be used, for example, for other crosslinking methods. These may also effect the selection of the functional group of the monomer C. The functional groups of the monomer C consist in particular not only of an attached H atom or an attached alkyl group. It is also possible to use two or more monomers C, from the examples stated below, for example, in various combinations.

It is possible to use monomers C which carry polar groups such as, for example, carboxyl groups, sulfonic and phosphonic acid groups, hydroxyl groups, lactam and lactone, N-substituted amide, N-substituted amine, carbamate, epoxy, thiol, alkoxy, and cyano groups, and also ethers.

It is possible to use moderately basic monomers C. Nonexhaustive examples of such are N,N-dialkyl-substituted amides, such as, for example, N,N-dimethylacrylamide, N,N-dimethylmethacrylamide, N-tert-butylacrylamide, N-vinylpyrrolidone, N-vinyllactam, dimethylaminoethyl methacrylate, dimethylaminoethyl acrylate, diethylaminoethyl methacrylate, diethylaminoethyl acrylate, N-methylolmethacrylamide, N-(butoxymethyl)methacrylamide, N-methylolacrylamide, N-(ethoxymethyl)acrylamide, N-isopropylacrylamide.

Further preferred examples of monomers C are hydroxyethyl acrylate, hydroxylpropyl acrylate, hydroxylethyl methacrylate, hydroxypropyl methacrylate, allyl alcohol, maleic anhydride, itaconic anhydride, itaconic acid, glycidyl methacrylate, phenoxyethyl acrylate, phenoxyethyl methacrylate, 2-butoxyethyl methacrylate, 2-butoxyethyl acrylate, cyanoethyl methacrylate, cyanoethyl acrylate, glyceryl methacrylate, 6-hydroxyhexyl methacrylate, vinyl acetic acid, tetrahydrofurfuryl acrylate, β-acryloyloxypropionoic acid, trichloroacrylic acid, fumaric acid, crotonic acid, aconitic acid, dimethylacrylic acid, this enumeration being nonexhaustive.

Further preferred examples of monomers C are vinyl esters, vinyl ethers, vinyl halides, vinylidene halides, vinyl compounds having aromatic ring systems and heterocyclic systems in α-position. Here again, nonexhaustive examples are given: vinyl acetate, vinylformamide, vinylpyridine, ethyl vinyl ether, vinyl chloride, vinylidene chloride, and acrylonitrile.

Further preferred examples of monomers C are photoinitiators having a copolymerizable double bond. Suitable photoinitiators are Norrish I and II photoinitiators. Examples thereof are benzoin acrylate and an acrylated benzophenone, as for example from UCB (Ebecryl P 36®). In principle it is possible to use all photoinitiators known to the skilled person that are able to crosslink the polymer via a radical mechanism under UV irradiation. An overview of possible photoinitiators which can be used, and which may be functionalized with a double bond, is given in Fouassier: "Photoinitiation, Photopolymerization and Photocuring: Fundamentals and Applications", Hanser-Verlag, Munich 1995, the relevant disclosure content of which is incorporated by reference. Complementarily, reference is made to Carroy et al. in "Chemistry and Technology of UV and EB Formulation for Coatings, Inks and Paints", Oldring (Ed.), 1994, SITA, London, the relevant disclosure content of which is incorporated by reference.

As monomers C it is also possible, furthermore, to add compounds which possess a high static glass transition temperature. Suitable components are aromatic vinyl compounds, such as styrene for example, in which case, preferably, the aromatic nuclei consist of $C_4$ to $C_{18}$ blocks and can also contain heteroatoms. Preferred examples are 4-vinylpyridine, N-vinylphthalimide, methylstyrene, 3,4-dimethoxystyrene, 4-vinylbenzoic acid, benzyl acrylate, benzyl methacrylate, phenyl acrylate, phenyl methacrylate, tert-butylphenyl acrylate, tert-butylphenyl methacrylate, 4-biphenylyl acrylate and methacrylate, 2-naphthyl acrylate and methacrylate, and also mixtures of these monomers, this enumeration being nonexhaustive.

The glass transition temperature of a PSA correlates directly, as described above, with its adhesion properties and its tack. In principle it is possible, in order to attain a preferred glass transition temperature $T_g$ of $T_g<25°$ C., in accordance with the remarks above, to select the monomers, and to choose the quantitative composition of the monomer mixture, in such a way that the desired $T_g$ is obtained in accordance with the Fox equation (E1) (cf. T. G. Fox, Bull. Am. Phys. Soc. 1 (1956) 123).

$$\frac{1}{T_g} = \sum_n \frac{w_n}{T_{g,n}} \quad (\text{E1})$$

In this equation, n represents the serial number of the monomers used, $W_n$ the mass proportion of the respective monomer n (wt %), and $T_{g,n}$ the respective glass transition temperature of the homopolymer of each of the monomers n in K.

According to a further embodiment, the monomer mixture includes a proportion of up to 20 wt %, more particularly up to 15 wt %, and preferably up to 10 wt % of alkyl acrylic esters or alkyl methacrylic esters with linear or singly branched alkyl groups having 16 to 22 C atoms. The monomer mixture may comprise, for example, 0.1 to 5 wt % of these monomers. While such monomers do in principle raise the glass transition temperature, this effect is nevertheless not so strongly pronounced when the amount thereof in the polyacrylate is low. Such monomers may be used, for example, for fine-tuning the properties of the PSA. Examples of these monomers are stearyl acrylate and behenyl acrylate. It is also possible, in particular by means of high proportions of the monomers A, to ensure that the relatively long side chains of, for example, stearyl acrylate are accommodated in the apolar side chain matrix of the monomers A and, accordingly, instances of side chain crystallization are prevented.

According to a further embodiment, the PSA comprises plasticizers, which are present in a proportion of up to 15 parts by weight per 100 parts by weight of polyacrylate in the PSA. Plasticizers may also be used at 0.1 to 10 parts by weight, more particularly 0.5 to 5 parts by weight, based on 100 parts by weight of polyacrylate. It is possible in principle to use all plasticizers known to the skilled person.

According to a further embodiment, the PSA comprises additives. Additives can be used at up to 40 parts by weight, more particularly 1 to 30 parts by weight, based on 100 parts by weight of polyacrylate. The additives may for example be selected from a group which encompasses fillers, as for example fibers, carbon black, zinc oxide, chalk, wollastonite, solid or hollow glass beads, microbeads, silica, and silicates, nucleating agents, electrically conductive materials, as for example conjugated polymers, doped conjugated polymers, metal pigments, metal particles, metal salts, graphite, expandants, compounding agents, aging inhibitors, in the form for example of primary and secondary antioxidants or in the form of light stabilizers, and combinations thereof.

The PSA may also consist of polyacrylate, tackifying resins, and optionally plasticizers, and optionally additives.

As a further aspect of the patent application, a method is specified for producing a pressure sensitive adhesive. According to at least one embodiment, the method comprises the steps of:

(A) generating a monomer mixture, the monomer mixture comprising
   a) 5 to 100 wt % of acrylic esters of the formula $CR^3_2\!=\!C(R^2)(COOR^1)$ as monomers A, where $R^1$ is a branched alkyl group having 16 to 22 C atoms which has at least two branching sites, $R^2$ is selected from H, methyl or halogen, and $R^3$ independently at each occurrence is selected from H or halogen,
   b) 0 to 20 wt % of acrylic acid of the formula $CR^5_2\!=\!C(R^4)(COOH)$ as monomers B, where $R^4$ is selected from H, methyl or halogen, and $R^5$ independently at each occurrence is selected from H or halogen,
   c) 0 to 30 wt % of olefinically unsaturated monomers having at least one functional group as monomers C, where the monomers C do not fall within the monomers A, B, and D, and
   d) 0 to 95 wt % of acrylic esters of the formula $CR^8_2\!=\!C(R^7)(COOR^6)$ as monomers D, where $R^6$ is a linear, singly branched, cyclic or polycyclic alkyl group having 1 to 14 C atoms, $R^7$ is selected from H, methyl or halogen, and $R^8$ independently at each occurrence is selected from H or halogen;

(B) polymerizing the monomer mixture to form polyacrylate;

(C) mixing the polyacrylate with at least one tackifying resin, which is used in a proportion of 20 to 60 parts by weight per 100 parts by weight of polyacrylate; and (D) at least partly crosslinking a mixture obtained according to step (C), to form the pressure sensitive adhesive.

Through the method it is possible to produce a PSA according to at least one inventive embodiment. The remarks made above are therefore also valid for corresponding embodiments of the method and, accordingly, subsequent details may also be valid for an inventive PSA.

Steps (A) to (D) are preferably carried out in this order, though it is also possible for certain steps, as for example (B) and (C), to overlap in time, in other words to run parallel. In step (B) it is possible in particular for predominantly linear polymer molecules to be formed, which are at least partly crosslinked with one another in step (D).

In step (C) it is possible optionally to add a crosslinker (as described later on below). Additives and/or plasticizers are envisaged in certain embodiments of the inventive PSA. They may likewise be introduced, optionally, in step (C). Step (C) may in principle also take place in a plurality of substeps. For example, one or more tackifying resins and optionally additives may be added and mixed in first, and then subsequently, preferably shortly before the crosslinking in step (D), one or more crosslinkers may be added.

According to a further embodiment the polymerization (step (B)) is carried out in a solvent. Solvents used may be, for example, water, a mixture of organic solvents, or a mixture of organic solvents and water. In general the aim is to minimize the amount of solvent used. For this purpose, the solvent may be admixed in step (A), for example.

Step (C) as well, preferably, may be carried out wholly or partly in the solvent, since to do so facilitates mixing. In this way, a particularly homogeneous distribution of the components of the PSA can be obtained.

Suitable organic solvents may be selected, for example, from a group which encompasses pure alkanes, as for example hexane, heptane, octane, and isooctane, aromatic hydrocarbons, as for example benzene, toluene, and xylene, esters, as for example ethyl acetate, propyl, butyl or hexyl acetate, halogenated hydrocarbons, as for example chlorobenzene, alkanols, as for example methanol, ethanol, ethylene glycol, and ethylene glycol monomethyl ether, ethers, as for example diethyl ether and dibutyl ether, and combinations thereof.

It is possible optionally to add a water-miscible or hydrophilic cosolvent, in order to ensure that the reaction mixture is present as a homogeneous phase during the crosslinking. Suitable cosolvents may be selected from a group which encompasses aliphatic alcohols, glycols, ethers, glycol ethers, pyrrolidines, N-alkylpyrrolidinones, N-alkylpyrrolidones, polyethylene glycols, propylene glycols, amides, carboxylic acids and salts thereof, esters, organosulfides, sulfoxides, sulfones, alcohol derivatives, hydroxyether derivatives, amino alcohols, ketones, and combinations thereof.

According to a further embodiment, the solvent is removed in a further step (E). This may be done in particular by heating. The removal of the solvent may take place, for example, in a drying oven or drying tunnel. The energy introduced may optionally be used for (a proportion of) the thermal crosslinking, i.e., thermal curing. Accordingly, step (E) may take place before step (D), may wholly or partly overlap with that step, or may match that step.

The polymerization (step (B)) may also take place without solvents, in other words in bulk. It is true that in that case it is possible subsequently to add one of the aforementioned solvents or solvent mixtures for step (C), although then that step is generally carried out in the absence of solvents as well, for economic reasons.

A polymerization in bulk is suitable, for example, for the production of hot melt acrylate PSAs. In this case, in particular, the prepolymerization technique is appropriate. In that case the polymerization is initiated with UV light, but taken only to a low conversion of about 10% to 30%. The resulting polymer syrup can subsequently be welded into films, for example, and then polymerized through to a high conversion in water. These pellets can then be employed as hot melt acrylate PSAs, preference being given to the use, for the melting operation, of film materials which are compatible with the polyacrylate.

According to a further embodiment, the polyacrylate for step (C) is liquefied by heating. This facilitates the miscibility, particularly if polymerization has taken place without solvent. "Liquefied" here is intended to denote that a solid polyacrylate is melted or, in the case of a viscous polyacrylate, the viscosity is greatly lowered. A mixing operation in the absence of solvent may take place, for example, in a suitable twin-screw extruder.

According to a further embodiment, a radical polymerization is carried out in step (B). For a polymerization which proceeds radically, preference is given to using initiator systems which additionally comprise further radical initiators for the polymerization, more particularly thermally decomposing, radical-forming azo or peroxo initiators. Initiators may be added in step (A), for example. Suitable in principle are all customary initiators for acrylates that are familiar to the skilled person. The generation of C-centered radicals is described in Houben Weyl, Methoden der Organischen Chemie, vol. E 19a, pp. 60-147, the relevant disclosure content of which is hereby incorporated by reference. These methods may likewise be employed for the purposes of the patent application.

Examples of suitable radical sources are peroxides, hydroperoxides, and azo compounds. The radical initiators may for example be selected from a group which encompasses potassium peroxodisulfate, dibenzoyl peroxide, cumene hydroperoxide, cyclohexanone peroxide, di-tert-butyl peroxide, 2,2'-azodi(2-methylbutyronitrile), azodiisobutyronitrile, cyclohexylsulfonyl acetyl peroxide, diisopropyl percarbonate, tert-butyl peroctoate, benzopinacol, and a combination thereof. With preference it is possible to use 1,1'-azobis(cyclohexanecarbonitrile) (Vazo 88™ from DuPont) and/or azodiisobutyronitrile (AIBN).

The polymerization can be carried out for example in polymerization reactors which in general are provided with a stirrer, a plurality of feed vessels, reflux condenser, heating and cooling, and are equipped for operation under $N_2$ atmosphere and superatmospheric pressure.

For the purpose of initiating polymerization, for initiators which decompose thermally, heat can be introduced. For thermally decomposing initiators, the polymerization can be initiated by heating to 50° C. to 160° C., according to initiator type.

Depending on conversion and temperature, the polymerization time in step (B) may be between 2 and 72 hours. The higher the reaction temperature that can be selected, in other words the higher the thermal stability of the reaction mixture, the lower the level at which, in general, the reaction time can be selected.

The polymerization generally takes place in such a way that for the polyacrylate an average molecular weight of 50 000 to 4 000 000 g/mol, more particularly 100 000 to 3 000 000 g/mol, and preferably 400 000 to 1 400 000 g/mol is obtained.

A comparatively low molecular weight of a comparatively narrow molecular weight distribution can be obtained by adding chain transfer agents, known to control or regulate polymerization, for the crosslinking. Such agents are especially suitable for radical crosslinking.

Examples of such chain transfer agents which can be added include alcohols, aromatics, such as toluene, for example, ethers, dithioethers, dithiocarbonates, trithiocarbonates, nitroxides, alkyl bromides, thiols, TEMPO and TEMPO derivatives.

In a further refinement, control reagents used as chain transfer agents are of the general formula (I) and/or (II):

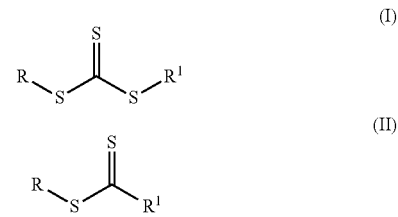

In these formulae, R and $R^1$ may be selected independently of one another as
  branched and unbranched $C_1$ to $C_{18}$ alkyl radicals, $C_3$ to $C_{18}$ alkenyl radicals, $C_3$ to $C_{18}$ alkynyl radicals,
  $C_1$-$C_{18}$ alkoxy radicals,
  $C_1$-$C_{18}$ alkyl radicals, $C_3$-$C_{18}$ alkenyl radicals, $C_3$-$C_{18}$ alkynyl radicals that are substituted by at least one OH group or by a halogen atom or by a silyl ether,
  $C_2$-$C_{18}$ heteroalkyl radicals having at least one O atom and/or one NR* group in the carbon chain, where R* may be any radical (more particularly an organic radical),
  $C_1$-$C_{18}$ alkyl radicals, $C_3$-$C_{18}$ alkenyl radicals, $C_3$-$C_{18}$ alkynyl radicals substituted by at least one ester group, amino group, carbonate group, cyano group, isocyano group and/or epoxide group and/or by sulfur,
  $C_3$-$C_{12}$ cycloalkyl radicals,
  $C_6$-$C_{18}$ aryl or benzyl radicals,
  hydrogen.

Control reagents of type (I) and (II) contain preferably the following compounds and/or substituents:
halogen atoms here are preferably F, Cl, Br or I, more preferably Cl and Br. Suitable alkyl, alkenyl, and alkynyl radicals in the various substitutents include both linear and branched chains.

Examples of alkyl radicals which contain 1 to 18 carbon atoms are methyl, ethyl, propyl, isopropyl, butyl, isobutyl, tert-butyl, pentyl, 2-pentyl, hexyl, heptyl, octyl, 2-ethylhexyl, tert-octyl, nonyl, decyl, undecyl, tridecyl, tetradecyl, hexadecyl, and octadecyl.

Examples of alkenyl radicals having 3 to 18 carbon atoms are propenyl, 2-butenyl, 3-butenyl, isobutenyl, n-2,4-pentadienyl, 3-methyl-2-butenyl, n-2-octenyl, n-2-dodecenyl, isododecenyl, and oleyl.

Examples of alkynyl having 3 to 18 carbon atoms are propynyl, 2-butynyl, 3-butynyl, n-2-octynyl, and n-2-octadecynyl.

Examples of hydroxy-substituted alkyl radicals are hydroxypropyl, hydroxybutyl or hydroxyhexyl.

Examples of halogen-substituted alkyl radicals are dichlorobutyl, monobromobutyl or trichlorohexyl.

A suitable $C_2$-$C_{18}$ heteroalkyl radical having at least one O atom of the carbon chain is —$CH_2$—$CH_2$—O—$CH_2$—$CH_3$, for example.

Serving as $C_3$-$C_{12}$ cycloalkyl radicals are, for example, cyclopropyl, cyclopentyl, cyclohexyl or trimethylcyclohexyl.

Serving as $C_6$-$C_{18}$ aryl radicals are, for example, phenyl, naphthyl, benzyl, 4-tert-butylbenzyl or other substituted phenyl, as for example ethyl, toluene, xylene, mesitylene, isopropylbenzene, dichlorobenzene or bromotoluene.

Additionally useful as control reagents are compounds of the following types (III) and (IV)

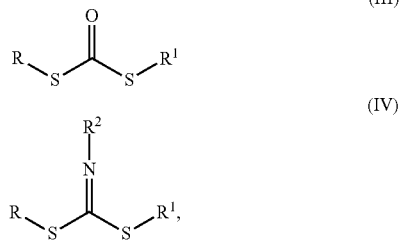

where $R^2$ likewise, and independently of R and $R^1$, may be selected from the groups listed above for those radicals.

In the case of a conventional "RAFT process" polymerization is usually taken only to low conversions (WO 98/01478 A1), in order to realize extremely narrow molecular weight distributions. As a result of the low conversions, however, these polymers cannot be used as PSAs, since the high proportion of residual monomers adversely affects the technical adhesive properties. Preferably, therefore, the control reagents stated above are optionally used as chain transfer agents, to bring about a bimodal molecular weight distribution. By means of highly efficient chain transfer agents it is possible, furthermore, to restrict (narrow) the molecular weight distribution, with beneficial effects in turn on the profile of technical adhesive properties.

As further chain transfer agents it is possible to use nitroxides. Radical stabilization is effected using, for example, nitroxides of type (Va) or (Vb):

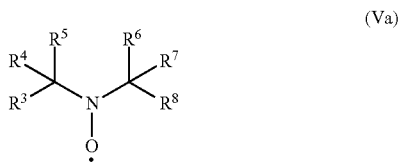

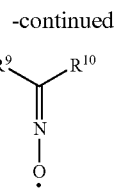

where $R^3$, $R^4$, $R^5$, $R^6$, $R^7$, $R^8$, $R^9$, $R^{10}$ independently of one another denote the following compounds or atoms:
i) halides, as for example chlorine, bromine or iodine,
ii) linear, branched, cyclic, and heterocyclic hydrocarbons having 1 to 20 carbon atoms, which may be saturated, unsaturated or aromatic,
iii) esters —$COOR^{11}$, alkoxides —$OR^{12}$ and/or phosphonates —$PO(OR^{13})_2$,
where $R^{11}$, $R^{12}$ or $R^{13}$ stand for radicals from the group ii).

Compounds of types (Va) or (Vb) may also be bonded to polymer chains of any kind, primarily such that at least one of the abovementioned radicals constitutes a polymer chain of this kind, and hence are also utilized for the construction of the PSAs.

Further suitable chain transfer agents for the polymerization are compounds of the following type:
2,2,5,5-tetramethyl-1-pyrrolidinyloxyl (PROXYL), 3-carbamoyl-PROXYL, 2,2-dimethyl-4,5-cyclohexyl-PROXYL, 3-oxo-PROXYL, 3-hydroxylimine-PROXYL, 3-aminomethyl-PROXYL, 3-methoxy-PROXYL, 3-tert-butyl-PROXYL, 3,4-di-tert-butyl-PROXYL,
2,2,6,6-tetramethyl-1-piperdinyloxy pyrrolidinyloxy (TEMPO), 4-benzoyloxy-TEMPO, 4-methoxy-TEMPO, 4-chloro-TEMPO, 4-hydroxy-TEMPO, 4-oxo-TEMPO, 4-amino-TEMPO, 2,2,6,6-tetraethyl-1-piperidinyloxyl, 2,2,6-trimethyl-6-ethyl-1-piperdinyloxyl,
N-tert-butyl 1-phenyl-2-methylpropyl nitroxide,
N-tert-butyl 1-(2-naphthyl)-2-methylpropyl nitroxide,
N-tert-butyl 1-diethylphosphono-2,2-dimethylpropyl nitroxide,
N-tert-butyl 1-dibenzylphosphono-2,2-dimethylpropyl nitroxide,
N-(1-phenyl-2-methylpropyl) 1-diethylphosphono-1-methylethyl nitroxide.
di-tert-butyl nitroxide,
diphenyl nitroxide, and
tert-butyl tert-amyl nitroxide.

It may also be of advantage, to increase the conversion, for an initiator to be added that possesses a crosslinking efficiency of greater than 5. Such initiators are, for example, Perkadox 16 from Akzo Nobel.

According to a further embodiment, an anionic polymerization is carried out in step (B). In this case in general a reaction medium is used, more particularly one or more inert solvents. Examples of such solvents are aliphatic and cycloaliphatic hydrocarbons or else aromatic hydrocarbons.

The living polymer in this case is generally represented by the structure $P_L(A)$-Me, where Me is a metal from the group I, as for example lithium, sodium or potassium, and $P_L(A)$ is a growing polymer block of the monomers A. The molar mass of the polymer under preparation is controlled by the ratio of initiator concentration to monomer concentration. Examples of suitable polymerization initiators suitably include n-propyllithium, n-butyllithium, sec-butyllithium, 2-naphthyllithium, cyclohexyllithium or octyllithium. It is further possible to use initiators based on samarium complexes for the polymerization, as is described in Macromolecules, 1995, 28, 7886, the relevant disclosure content of which is hereby incorporated by reference. It is possible, furthermore, to use difunctional initiators as well, such as to use 1,1,4,4-tetraphenyl-1,4-dilithiobutane or 1,1,4,4-tetraphenyl-1,4-dilithioisobutane, for example. Coinitiators may likewise be employed. Suitable coinitiators include lithium halides, alkali metal alkoxides or alkylaluminum compounds.

According to a further embodiment, in step (D), the crosslinking takes place by irradiation with UV radiation, by irradiation with an ionizing radiation, thermally, or through a combination thereof.

Crosslinking may take place in particular by means of UV radiation or of an ionizing radiation, as for example electron beams. It may be accomplished, for example, by short-term irradiation with UV radiation in the range from 200 to 400 mm using commercially customary high-pressured or medium-pressured mercury lamps with an output of 80 to 240 W/cm, for example, or with ionizing radiation, such as electron beams, for example.

Optionally it is possible supplementarily or else alternatively to this for a thermal curing step to take place. This may be accomplished, for example, during the removal of solvent or else in bulk.

According to a further embodiment, crosslinkers are added in step (C). This may take place in particular shortly before step (D), in which the crosslinkers take effect. The choice of the crosslinkers is guided in particular by the nature of the crosslinking.

Examples of suitable crosslinkers for electron beam crosslinking or UV crosslinking are di- or polyfunctional acrylates, di- or polyfunctional isocyanates (including those in block form), or di- or polyfunctional epoxides. They are added typically in proportions of between 0.1 and 5 parts by weight, more particularly between 0.2 and 3 parts by weight, based on 100 parts by weight of polyacrylate.

According to a further embodiment, thermally activatable crosslinkers are used, selected from a group which encompasses Lewis acids, metal chelates, metal salts, di- or polyfunctional epoxides, di- or polyfunctional isocyanates, and a combination thereof. Examples of metal chelates are aluminum chelate, as for example aluminum(III) acetylacetonate, or titanium chelate.

The degree of crosslinking in the case of the thermal crosslinking may be controlled for example through the amount of crosslinker added. Thus, for example, for polyacrylates with a high elastic component, preference is given to adding greater than 0.5 part by weight, more particularly greater than 0.75 part by weight, of metal chelate or epoxy compound or isocyanate compound, based on 100 parts by weight of polyacrylate base polymer. Preference is given to using more than 1.0 part by weight. In general not more than 10 parts by weight of crosslinker should be added, in order to prevent complete formation of a lacquerlike film.

For possible crosslinking with UV radiation it is possible to use free UV-absorbing photoinitiators, these being photoinitiators which do not carry one or more double bonds and therefore cannot be copolymerized into the polymer. There is no need for such photoinitiators if the monomers C used are themselves photoinitiators, as described above. However, a combination of free photoinitiators and such monomers C is also possible.

Examples of suitable photoinitiators are benzoin ethers, as for example benzoin methyl ether and benzoin isopropyl ether, substituted acetophenones, as for example 2,2-diethoxyacetophenone (available as Irgacure 651® from Ciba Geigy), 2,2-dimethoxy-2-phenyl-1-phenylethanone, dimethoxyhydroxyacetophenone, substituted α-ketols, as for example 2-methoxy-2-hydroxypropiophenone, aromatic sulfonyl chlorides, as for example 2-naphthylsulfonyl chloride, and photoactive oximes, as for example 1-phenyl-1,2-propanedione-2-(O-ethoxycarbonyl) oxime.

The abovementioned photoinitiators and others which can be used, and others of the Norrish I or Norrish II type, may include, for example, the following substituents: benzophenone, acetophenone, benzyl, benzoin, hydroxyalkylphenone, phenyl cyclohexyl ketone, anthraquinone, trimethylbenzoylphosphine oxide, methylthiophenyl morpholine ketone, amino ketone, azobenzoin, thioxanthon, hexarylbisimidazole, triazine, or fluorenone, it being possible for each of these radicals additionally to be substituted by one or more halogen atoms and/or by one or more alkyloxy groups and/or by one or more amino groups or hydroxyl groups. A representative overview is given by Fouassier: "Photoinitiation, Photopolymerization and Photocuring: Fundamentals and Applications", Hanser-Verlag, Munich 1995, the relevant disclosure content of which is hereby incorporated by reference. Reference is further made to Carroy et al. in "Chemistry and Technology of UV and EB Formulation for Coatings, Inks and Paints", Oldring (Ed.), 1994, SITA, London, the relevant disclosure content of which is hereby incorporated by reference.

Indicated as a further aspect of the patent application is the production of an adhesive tape. At least according to one embodiment, the method for producing the adhesive tape can be integrated into The method as claimed in the invention for producing a PSA. Accordingly it may also be regarded as further embodiment(s) of the method for producing a PSA. According to at least one embodiment for the production of an adhesive tape, where the adhesive tape comprises a PSA according to at least one inventive embodiment and a carrier, the carrier is provided with the PSA.

According to a further embodiment, the carrier is provided with the PSA by the mixture obtained after step (C) being applied to the carrier and being subsequently crosslinked in step (D). Application takes place in particular, in layer form, forming an adhesive layer. The carrier may be a permanent or a temporary carrier.

In further, optional method steps, the adhesive tape may be provided with further pressure-sensitive adhesive layers, possibly including those of the invention. It is possible optionally for further carriers to be introduced in the adhesive tape. It is also possible optionally for further steps known to the skilled person to take place, such as the cutting of the adhesive tape to shape, for example.

As a further aspect of the patent application, an adhesive tape is specified. The adhesive tape comprises a carrier and an adhesive layer which comprises or consists of a PSA according to at least one embodiment of the invention. The PSA may therefore be arranged in layer form, more particularly directly, on the carrier. It may be a part of an adhesive layer or may entirely form such a layer. It preferably forms an adhesive layer completely. One adhesive layer may cover some or all of one side of the carrier.

As carriers it is possible in principle to use permanent and/or temporary carriers. Permanent carriers remain in the adhesive tape, while temporary carriers are removed for bonding. They are used primarily for the protection and for the transport of the adhesive tape.

Suitable permanent carriers include in principle all materials known to the skilled person. They may be selected, for example, from films, based for example on polyester, PET, PE, PP, BOPP, or PVC, nonwovens, foams, woven fabrics, and fabric films.

Suitable temporary carriers include in principle all materials known to the skilled person. They may be selected, for example, from release paper, based for example on glassine, HDPE or LDPE, release films, based for example on PET, MOPP, or PE, and from other antiadhesively furnished materials, such as siliconized or PE-coated papers or films, for example.

According to a further embodiment, the adhesive tape comprises only one adhesive layer, with this adhesive layer comprising or consisting of the inventive PSA. Adhesive tapes of this embodiment may preferably comprise two temporary carriers as described above, optionally selected independently of one another, thus turning the adhesive tape into what is called an adhesive transfer tape. The carriers are preferably located on opposite sides of the PSA, allowing the adhesive transfer tape to be unwindable again after having been wound up. In an adhesive transfer tape, only the PSA generally remains after bonding. The adhesive tape of the invention may therefore be designed as an adhesive transfer tape. Because of the high proportions of resin, it is generally not used for the bonding of optical components, given the possibility of clouding under high humidity or of yellowing on prolonged thermal storage.

According to a further embodiment, the adhesive tape comprises two or more, more particularly two, adhesive layers, of which at least one comprises or consists of PSA according to at least one inventive embodiment.

In the case of adhesive tapes of this embodiment, a permanent carrier is preferably used. This carrier may be coated wholly or partly on one side with an inventive PSA. On the opposite side, wholly or partly, a further adhesive layer is produced. This layer may likewise comprise or consist of an inventive PSA having the same or different properties, or else may be a conventional adhesive layer. For certain applications, adhesive tapes having two different adhesive layers are advantageous. For example, a combination of an inventive strongly, largely irreversible adhering adhesive layer and of a reversibly adhering adhesive layer which can be detached from the substrate again may be advantageous. The adhesive layers may be provided with a temporary carrier on the side remote from the permanent carrier. By this means the adhesive tape can be wound up and unwound again for example.

As a further aspect of the patent application, a use is specified for a PSA. A PSA according to at least one inventive embodiment is used for bonding substrates having a surface energy of less than 40 dyn/cm$^2$, more particularly less than 35 dyn/cm$^2$ or even less than 30 dyn/cm$^2$. The use encompasses, for example, the bonding of LSE materials such as UV-curing paints, powder coatings, and also polyolefins such as polypropylene (PP), high-pressure polyethylene (LDPE), low-pressure polyethylene (HDPE), ultra-high molecular weight polyethylene (UHMWPE), and polymers of ethylene-propylene-diene monomer (EPDM), and also the bonding of materials which as well as a low surface energy possess a rough surface and, moreover, possess low Shore A hardnesses of less than 50, more particularly less than 40, such materials being selected, for example, from open-cell foams of PE, EPDM, polyester or polyurethane.

Specified as a further aspect of the patent application is a use of monomers. According to at least one embodiment an acrylic ester of the formula $CR^3_2{=}C(R^2)(COOR^1)$ is used for producing a pressure sensitive adhesive, where $R^1$ is a branched alkyl group having 16 to 22 C atoms and including at least two branching sites, $R^2$ is selected from H, methyl or halogen, and $R^3$ independently at each occurrence is selected from H or halogen. The acrylic ester corresponds to a monomer A according to at least one of the embodiments described above. The acrylic ester may be used more particularly for producing a pressure sensitive adhesive which is suitable for bonding substrates having a surface energy of less than 40 dyn/cm$^2$, more particularly of less than 35 dyn/cm$^2$ or even less than 30 dyn/cm$^2$.

Test Method

Polyacrylate and/or PSAs can be characterized using the test methods set out below.

Gel permeation chromatography (GPC) (test A):

The average molecular weight $M_w$ and the polydispersity PD were determined in the eluent THF with 0.1 vol % of trifluoroacetic acid (vol %=percent by volume).

Measurement took place at 25° C. The pre-column used was PSS-SDV, 5 μm, 10$^3$ Å, ID 8.00 mm×50 mm. Separation took place using the columns PSS-SDV, 5 μm, 10$^3$ Å and also 10$^5$ Å and 10$^6$ Å each with ID 8.00 mm×300 mm (1 Å=10$^{-10}$ m). The sample concentration was 4 g/l, the flow rate 1.0 ml per minute. Measurement took place against PMMA standards.

Rheometer measurements (test B):

The measurements were carried out using a Rheometrics Dynamic Systems RDA II rheometer in plate-on-plate configuration. The specimen measured was a circular specimen having a diameter of 8 mm and a thickness of 1 mm. The circular specimen was diecut from a carrier less adhesive sheet 1 mm thick.

Measuring conditions: temperature sweep from −30° C. to 130° C. at 10 rad/s.

180° Bond strength test (test C):

The 180° bond strength is measured in accordance with PSTC-1. A strip 20 mm wide of a PSA applied to the polyester was applied to an HDPE or PP plaque. The PSA strip was pressed onto the substrate twice with a 2 kg weight. Immediately thereafter the adhesive tape was removed at 300 mm/min and an angle of 180° from the substrate. The PE and PP plaques were washed beforehand twice with acetone and once with isopropanol. The measurement results are reported in N/cm and have been averaged from three measurements. All measurements were conducted at room temperature under standardized conditions.

EXAMPLES

The examples which follow serve to elucidate the contents of the patent application in more detail, without any intention that the selection of the examples should restrict the content of the patent application in any way at all.

Inventive Example 1 (Polymer 1)

A 2 L glass reactor conventional for radical polymerizations was charged with 8 g of acrylic acid, 196 g of 2-ethylhexyl acrylate, 196 g of a mixture of monomers A for which $R^2{=}R^3{=}H$ and $R^1$ is a C17 alkyl chain having three branching sites and the glass transition temperature of the homopolymer is −72° C., 133 g of special-boiling-point spirit 69/95, and 133 g of acetone. After nitrogen gas had been passed through the reaction solution with stirring for 45 minutes, the reactor was heated to 58° C. and 0.2 g of 2,2'-azodi(2-methylbutyronitrile) (Vazo 67™ from DuPont) was added. The external heating bath was then heated to 75° C. and the reaction was carried out constantly at this external temperature. After a reaction time of 1 hour, 20 g of isopropanol were added. After 2.5 hours, the batch was diluted with 100 g of acetone. After a reaction time of 4 hours, a further 0.2 g of Vazo 67™ was added. After a polymerization time of 7 hours, the batch was diluted with 100 g of special-boiling-point spirit 60/95, and after 22 hours with 100 g of acetone. After a reaction time of 24 hours, the polymerization was discontinued and the reaction vessel was cooled to room temperature. The polymer was analyzed by test method A. The molecular weight was 718 000 g/mol.

Inventive Example 2 (Polymer 2)

A 2 L glass reactor conventional for radical polymerizations was charged with 8 g of acrylic acid, 392 g of a mixture of monomers A for which $R^2=R^3=H$ and $R^1$ is a C17 alkyl chain having three branching sites and the glass transition temperature of the homopolymer is −72° C., 133 g of special-boiling-point spirit 69/95, and 133 g of acetone. After nitrogen gas had been passed through the reaction solution with stirring for 45 minutes, the reactor was heated to 58° C. and 0.2 g of Vazo 67™ (from DuPont) was added. The external heating bath was then heated to 75° C. and the reaction was carried out constantly at this external temperature. After a reaction time of 1 hour, 20 g of isopropanol were added. After 2.5 hours, the batch was diluted with 100 g of acetone. After a reaction time of 4 hours, a further 0.2 g of Vazo 67™ was added. After a polymerization time of 7 hours, the batch was diluted with 100 g of special-boiling-point spirit 60/95, and after 22 hours with 100 g of acetone. After a reaction time of 24 hours, the polymerization was discontinued and the reaction vessel was cooled to room temperature. The polymer was analyzed by test method A. The molecular weight was 674 000 g/mol.

Comparative Example 1 (Reference Polymer 1)

A 2 L glass reactor conventional for radical polymerizations was charged with 8 g of acrylic acid, 192 g of isobornyl acrylate (IBOA), 192 g of 2-ethylhexyl acrylate, 133 g of special-boiling-point spirit 69/95, and 133 g of acetone. After nitrogen gas had been passed through the reaction solution with stirring for 45 minutes, the reactor was heated to 58° C. and 0.2 g of Vazo 67™ (from DuPont) was added. The external heating bath was then heated to 75° C. and the reaction was carried out constantly at this external temperature. After 2.5 hours, the batch was diluted with 100 g of acetone. After a reaction time of 4 hours, a further 0.2 g of Vazo 67™ was added. After a polymerization time of 5 hours, the batch was diluted with 100 g of acetone, and after 6 hours with 100 g of special-boiling point spirit 60/95. After a reaction time of 24 hours, the polymerization was discontinued and the reaction vessel was cooled to room temperature. The polymer was analyzed by test method A. The molecular weight was 703 000 g/mol.

Comparative Example 2 (Reference Polymer 2)

A 2 L glass reactor conventional for radical polymerizations was charged with 8 g of acrylic acid, 120 g of stearyl acrylate 16/18 (SA 1618, BASF SE), 272 g of 2-ethylhexyl acrylate, 133 g of special-boiling-point spirit 69/95, and 133 g of acetone. After nitrogen gas had been passed through the reaction solution with stirring for 45 minutes, the reactor was heated to 58° C. and 0.2 g of Vazo 67™ (from DuPont) was added. The external heating bath was then heated to 75° C. and the reaction was carried out constantly at this external temperature. After 2.5 hours, the batch was diluted with 100 g of acetone. After a reaction time of 4 hours, a further 0.2 g of Vazo 67™ was added. After a polymerization time of 5 hours, the batch was diluted with 100 g of acetone, and after 6 hours with 100 g of special-boiling point spirit 60/95. After a reaction time of 24 hours, the polymerization was discontinued and the reaction vessel was cooled to room temperature. The polymer was analyzed by test method A. The molecular weight was 588 000 g/mol.

Blending with resins and crosslinkers, thermal curing:

The polymer was blended with various resins and crosslinkers in solution with stirring.

The PSA mixtures are applied from solution with a solids content of 28% to a Saran-primed PET film 23 μm thick, and dried at 120° C. for 10 minutes. The coat weight after drying was 50 g/m².

Materials:

Foral® 85, rosin ester resin from Eastman, softening range at 85° C.

Sylvares® TP105P, terpene-phenolic resin from Arizawa, softening range between 102 and 108° C.

Al(III) chelate: aluminum(III) acetylacetonate.

The results are described below.

Table 1 lists the compositions of the inventive examples:

TABLE 1

| Inventive example | Polymer 1 | Polymer 2 | Resin | Crosslinker | tan δ at 130° C./10 rad s (test B) |
|---|---|---|---|---|---|
| 1 | X | | 35% Foral 85 | 0.3% Al(III) chelate | 0.43 |
| 2 | X | | 35% Sylvares 105 | 0.3% Al(III) chelate | 0.37 |
| 3 | X | | 45% Foral 85 | 0.3% Al(III) chelate | 0.35 |
| 4 | | X | 35% Foral 85 | 0.3% Al(III) chelate | 0.45 |
| 5 | | X | 40% Foral 85 | 0.3% Al(III) chelate | 0.42 |
| 6 | | X | 45% Foral 85 | 0.3% Al(III) chelate | 0.38 |

Table 2 lists the compositions of the comparative examples:

TABLE 2

| Comparative example | Reference Polymer 1 | Reference Polymer 2 | Resin | Crosslinker | tan δ at 130° C./10 rad s (test B) |
|---|---|---|---|---|---|
| 1 | X | | 35% Foral 85 | 0.3% Al(III) chelate | 0.24 |
| 2 | X | | 35% Sylvares 105 | 0.3% Al(III) chelate | 0.22 |
| 3 | X | | 45% Foral 85 | 0.3% Al(III) chelate | 0.20 |
| 4 | | X | 35% Foral 85 | 0.3% Al(III) chelate | 0.28 |
| 5 | | X | 40% Foral 85 | 0.3% Al(III) chelate | 0.24 |
| 6 | | X | 45% Foral 85 | 0.3% Al(III) chelate | 0.22 |

The inventive examples, at 49 wt % and 98 wt %, respectively, have a high proportion of monomers A in the polyacrylate. The reference polymer 1, at 49 wt % of IBOA, likewise has a high proportion of an apolar component, but this component raises the static glass transition temperature of the adhesive. Reference polymer 2, with stearyl acrylate 16/18, includes a monomer having a long but linear alkyl group, which likewise raises the glass transition temperature.

For comparison and to test the bond strength (abbreviated to BS) on apolar surfaces, all of the polymers were blended with two different resins. The crosslinker proportion was kept constant with 0.3% of aluminum(III) chelate. The tan δ values measured are in an advantageous range from 0.38 to 0.45 for the inventive examples, and in a less advantageous range from 0.20 to 0.28 for the comparative examples.

Table 3 below lists technical adhesive properties of the individual inventive examples:

TABLE 3

| Inventive example | BS PE [N/cm] (Test C) | BS PP [N/cm] (Test C) |
|---|---|---|
| 1 | 3.9 | 4.2 |
| 2 | 3.5 | 3.9 |
| 3 | 4.8 | 4.6 |
| 4 | 3.8 | 4.3 |
| 5 | 4.2 | 4.5 |
| 6 | 5.0 | 5.6 |

Table 4 below lists technical adhesive properties of the individual comparative examples:

TABLE 4

| Comparative example | BS PE [N/cm] (Test C) | BS PP [N/cm] (Test C) |
|---|---|---|
| 1 | 0.3 | 0.3 |
| 2 | 0.4 | 0.2 |
| 3 | 0.3 | 0.2 |
| 4 | 0.5 | 0.4 |
| 5 | 0.3 | 0.6 |
| 6 | 0.5 | 0.3 |

From the inventive examples it can be found that the bond strengths are situated at a very high level both to polyethylene (PE) and to polypropylene (PP). Both substrates have a surface tension of about 30 dyn/cm$^2$ and are therefore situated in the apolar range. The bond strengths measured are at least 3.5 N/cm.

Comparative examples 1 to 6, in contrast, bond very weakly. The bond strengths are all well below 1 N/cm. Furthermore, the adhesives exhibit severe "clattering". This points to a relatively high glass transition temperature. Moreover, stearyl acrylate possesses a tendency toward side chain crystallization.

The inventive examples, in contrast, demonstrate that with the monomers A, which include a highly branched, long-chain alkyl group R$^1$, it is possible to add large amounts of tackifying resins, allowing even high bond strengths, especially to apolar substrates, to be achieved in this way.

The invention claimed is:

1. A pressure sensitive adhesive comprising:
   an at least partly crosslinked polyacrylate based on a monomer mixture, the monomer mixture comprising
   a) 5 to 100 wt. % of acrylic esters of the formula $CR^3{}_2{=}C(R^2)(COOR^1)$ as monomers A, where R$^1$ is a branched alkyl group having 16 to 22 C atoms which has at least two branching sites, R$^2$ is selected from the group consisting of H, methyl and halogen, and R$^3$ independently at each occurrence is H or halogen,
   b) 0 to 20 wt. % of acrylic acid of the formula $CR^5{}_2{=}C(R^4)(COOH)$ as monomers B, where R$^4$ is selected from the group consisting of H, methyl and halogen, and R$^5$ independently at each occurrence is H or halogen,
   c) 0 to 30 wt. % of olefinically unsaturated monomers having at least one functional group as monomers C, where the monomers C do not fall within the monomers A, B, and D, and
   d) 0 to 95 wt. % of acrylic esters of the formula $CR^8{}_2{=}C(R^7)(COOR^6)$ as monomers D, where R$^6$ is a linear, singly branched, cyclic or polycyclic alkyl group having 1 to 14 C atoms, R$^7$ is selected from the group consisting of H, methyl and halogen, and R$^8$ independently at each occurrence is H or halogen;
   at least one tackifying resin, which is present in a proportion of 20 to 60 parts by weight per 100 parts by weight of polyacrylate.

2. The pressure sensitive adhesive as claimed in claim 1, at least half of the monomers A including an alkyl group R$^1$ having three or more branching sites.

3. The pressure sensitive adhesive as claimed in claim 1, wherein R$^2$ is H or methyl and R$^3$ is H in the monomers A.

4. The pressure sensitive adhesive as claimed in claim 1, wherein the alkyl groups R$^1$ of the monomers A have a main chain on which side chains are attached at the branching sites, and at least 75% of the side chains have 2 to 4 C atoms.

5. The pressure sensitive adhesive of claim 1, wherein the tackifying resin has an average molecular weight of less than 4000 g/mol.

6. The pressure sensitive adhesive as claimed in claim 1, wherein the tackifying resin is selected from the group consisting of pinene resins, indene resins, and rosins, and also their disproportionate, hydrogenated, polymerized or esterified derivatives and salts; aliphatic hydrocarbon resins; alkylaromatic hydrocarbon resins; aromatic hydrocarbon resins; terpene resins; terpene-phenolic resins; C5 and C9 hydrocarbon resins, which may be at least partly hydrogenated; natural resins; and combinations thereof.

7. The pressure sensitive adhesive as claimed in claim 1, wherein the tackifying resin has a DACP of greater than 0° C.

8. The pressure sensitive adhesive as claimed in claim 1, wherein the tackifying resin has a DACP of less than −20° C.

9. The pressure sensitive adhesive as claimed in claim 1, wherein R$^6$ in the monomers D is selected from the group consisting of methyl, ethyl, propyl, pentyl, hexyl, heptyl, octyl, nonyl, decyl, undecyl, lauryl, and the branched isomers thereof; cycloalkyl groups and polycyclic alkyl groups, the cycloalkyl groups and polycyclic alkyl groups optionally being substituted by alkyl groups, halogen atoms or cyano groups; and combinations thereof.

10. The pressure sensitive adhesive as claimed in claim 1, wherein the monomer mixture comprises a proportion of at least 80 wt. % of monomers A or of at least 80 wt. % of the monomers A and D together.

11. The pressure sensitive adhesive as claimed in claim 10, wherein the tackifying resin is present in a proportion of at least 40 parts by weight per 100 parts by weight of polyacrylate.

12. The pressure sensitive adhesive as claimed in claim 1, wherein the monomer mixture comprises a proportion of monomers A of up to 40 wt. %.

13. The pressure sensitive adhesive as claimed in claim 1, wherein the monomer mixture comprises a proportion of 0.01 to 10 wt. % of monomers B and/or of 0.01 to 20 wt. % of monomers C.

14. A method for producing a pressure sensitive adhesive, comprising the steps of:
   (A) generating a monomer mixture, the monomer mixture comprising
   a) 5 to 100 wt. % of acrylic esters of the formula $CR^3_2$=$C(R^2)(COOR^1)$ as monomers A, where $R^1$ is a branched alkyl group having 16 to 22 C atoms which has at least two branching sites, $R^2$ is selected from the group consisting of H, methyl and halogen, and $R^3$ independently at each occurrence is H or halogen,
   b) 0 to 20 wt. % of acrylic acid of the formula $CR^5_2$=$C(R^4)(COOH)$ as monomers B, where $R^4$ is selected from the group consisting of H, methyl and halogen, and $R^5$ independently at each occurrence is H or halogen,
   c) 0 to 30 wt. % of olefinically unsaturated monomers having at least one functional group as monomers C, where the monomers C do not fall within the monomers A, B, and D, and
   d) 0 to 95 wt. % of acrylic esters of the formula $CR^8_2$=$C(R^7)(COOR^6)$ as monomers D, where
   $R^6$ is a linear, singly branched, cyclic or polycyclic alkyl group having 1 to 14 C atoms, $R^7$ is selected from H, methyl and halogen, and $R^8$ independently at each occurrence is H or halogen;
   (B) polymerizing the monomer mixture to form polyacrylate;
   (C) mixing the polyacrylate with at least one tackifying resin, which is used in a proportion of 20 to 60 parts by weight per 100 parts by weight of polyacrylate; and
   (D) at least partly crosslinking a mixture obtained according to step (C), to form the pressure sensitive adhesive.

15. The method as claimed in claim 14, step (B) being carried out in a solvent.

16. The method as claimed in claim 15, the solvent in a further step (E) being removed by heating.

17. The method as claimed in claim 14, the polyacrylate for step (C) being liquefied by heating.

18. The method as claimed in claim 14, the crosslinking in step (D) taking place by irradiation with UV radiation, by irradiation with an ionizing radiation, thermally, or through a combination thereof.

19. A pressure sensitive adhesive produced by the method of claim 14.

20. An adhesive tape comprising a pressure sensitive adhesive of claim 19 and a carrier, and the carrier being provided with the pressure sensitive adhesive.

21. The adhesive tape as claimed in claim 20, the carrier being provided with the pressure sensitive adhesive by the mixture obtained according to step (C) being applied to the carrier and subsequently crosslinked in step (D).

22. A method for bonding substrates having a surface energy of less than 40 $dyn/cm^2$, which comprises bonding said substrates with the pressure-sensitive adhesive of claim 19.

* * * * *